United States Patent
Rofougaran (10) Patent No.: US 8,340,712 B2
(45) Date of Patent: *Dec. 25, 2012

(54) METHOD AND SYSTEM FOR UTILIZING DIPLEXER/DUPLEXER FOR WCDMA OPERATION AS A FILTER FOR SUPPORTING GSM-BASED OPERATION

(75) Inventor: Ahmadreza Rofougaran, Marina Del Rey, CA (US)

(73) Assignee: Broadcom Corporation, Irvine, CA (US)

( * ) Notice: Subject to any disclaimer, the term of this patent is extended or adjusted under 35 U.S.C. 154(b) by 1198 days.

This patent is subject to a terminal disclaimer.

(21) Appl. No.: 11/536,648

(22) Filed: Sep. 29, 2006

(65) Prior Publication Data

US 2008/0081577 A1  Apr. 3, 2008

(51) Int. Cl.
*H04B 1/18* (2006.01)
(52) U.S. Cl. .................. 455/552.1; 455/553.1
(58) Field of Classification Search .................. 455/436, 455/84, 88, 78, 82, 83, 280, 289, 338, 339, 455/552.1, 553.1, 102, 127.4, 168.1; 370/276, 370/302

See application file for complete search history.

(56) References Cited

U.S. PATENT DOCUMENTS

| | | | |
|---|---|---|---|
| 5,963,854 A * | 10/1999 | Andreasson et al. ........... 455/82 |
| 6,393,299 B1 | 5/2002 | Mizumoto | |
| 6,456,172 B1 * | 9/2002 | Ishizaki et al. ................. 333/133 |
| 6,584,090 B1 * | 6/2003 | Abdelgany et al. ........... 370/342 |
| 6,708,044 B1 | 3/2004 | Puknat | |
| 6,725,426 B1 * | 4/2004 | Pavlov .......................... 715/205 |
| 6,741,847 B1 * | 5/2004 | Claxton et al. ................ 455/306 |
| 6,912,406 B2 * | 6/2005 | Lahlum et al. ............. 455/553.1 |
| 6,917,815 B2 * | 7/2005 | Hajimiri et al. ............ 455/552.1 |
| 7,092,676 B2 * | 8/2006 | Abdelgany et al. ............. 455/76 |
| 7,110,433 B2 * | 9/2006 | Feher ............................ 375/141 |
| 7,260,424 B2 | 8/2007 | Schmidt | |
| 2002/0090974 A1 * | 7/2002 | Hagn ............................ 455/552 |
| 2002/0132597 A1 * | 9/2002 | Peterzell et al. .............. 455/130 |
| 2002/0140520 A1 * | 10/2002 | Hikita et al. .................. 333/133 |
| 2003/0021367 A1 * | 1/2003 | Smith .......................... 375/346 |
| 2003/0193923 A1 | 10/2003 | Abdelgany et al. | |
| 2003/0193997 A1 * | 10/2003 | Dent et al. .................... 375/219 |
| 2004/0131014 A1 | 7/2004 | Thompson | |
| 2004/0196934 A1 * | 10/2004 | Petrov et al. .................. 375/350 |
| 2004/0259594 A1 * | 12/2004 | Choi ......................... 455/556.1 |

(Continued)

FOREIGN PATENT DOCUMENTS

KR  20010078104  8/2001

(Continued)

*Primary Examiner* — Ajit Patel
*Assistant Examiner* — Myron K Wyche
(74) *Attorney, Agent, or Firm* — Farjami & Farjami LLP (57) ABSTRACT

Aspects of a method and system for utilizing a diplexer/duplexer for WCDMA operation as a filter for supporting GSM-based operation are provided. A receiver portion of a wireless device may receive WCDMA signals and GSM signals via at least one duplexer or diplexer. The duplexers may enable bandpass filtering of received GSM signals. The wireless device may enable receiving the WCDMA signals and the GSM signals via a single antenna coupled to the duplexers. The receiver portion may also enable selecting a processing path for received WCDMA signals or a processing path for received GSM signals. The receiver portion may enable amplification and filtering of the WCDMA signals. Filtering of the WCDMA signals may be performed via surface acoustic wave (SAW) filters. The receiver portion may also enable filtering of the GSM signals via the duplexers and amplification of the filtered GSM signals.

24 Claims, 5 Drawing Sheets

U.S. PATENT DOCUMENTS

| | | | |
|---|---|---|---|
| 2005/0032548 A1* | 2/2005 | Frank | 455/552.1 |
| 2005/0094744 A1* | 5/2005 | Ramachandran et al. | 375/316 |
| 2005/0245201 A1* | 11/2005 | Ella et al. | 455/78 |
| 2005/0266811 A1 | 12/2005 | Weiss | |
| 2005/0270216 A1* | 12/2005 | Jiang et al. | 341/155 |
| 2006/0056355 A1* | 3/2006 | Love et al. | 370/332 |
| 2007/0030116 A1* | 2/2007 | Feher | 340/5.53 |
| 2007/0032238 A1* | 2/2007 | Kim et al. | 455/436 |
| 2007/0032246 A1* | 2/2007 | Feher | 455/456.1 |
| 2007/0032266 A1* | 2/2007 | Feher | 455/553.1 |
| 2007/0066245 A1* | 3/2007 | Snider | 455/78 |
| 2007/0099580 A1* | 5/2007 | Hosokawa et al. | 455/76 |
| 2007/0155344 A1* | 7/2007 | Wiessner et al. | 455/78 |
| 2009/0093270 A1* | 4/2009 | Block et al. | 455/552.1 |

FOREIGN PATENT DOCUMENTS

| | | |
|---|---|---|
| KR | 20030006051 | 1/2003 |
| WO | WO 2006/029082 | 3/2006 |

* cited by examiner

METHOD AND SYSTEM FOR UTILIZING
DIPLEXER/DUPLEXER FOR WCDMA
OPERATION AS A FILTER FOR
SUPPORTING GSM-BASED OPERATION

CROSS-REFERENCE TO RELATED APPLICATIONS/INCORPORATION BY REFERENCE

This application makes reference to:
U.S. application Ser. No. 11/536,678, filed on Sep. 29, 2006;
U.S. application Ser. No. 11/536,682, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,662, filed on Sep. 29, 2006;
U.S. application Ser. No. 11/536,688, filed on Sep. 29, 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

The above stated applications are hereby incorporated herein by reference in their entirety.

FIELD OF THE INVENTION

Certain embodiments of the invention relate to handling of wireless signals. More specifically, certain embodiments of the invention relate to a method and system for utilizing a diplexer/duplexer for WCDMA operation as a filter for supporting GSM-based operation.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the data connections, such as the mobile Internet, for example, is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The evolution of WCDMA technology has resulted in the development of various wireless communication technologies, including General Packet Radio Service (GPRS), Enhanced Data rates for GSM (Global System for Mobile communications) Evolution (EDGE), Universal Mobile Telecommunications System (UMTS), High Speed Downlink Packet Access (HSDPA), and High Speed Uplink Packet Access (HSUDPA), for example. In this regard, the GPRS and EDGE technologies may be utilized for enhancing the data throughput of present second generation (2G) systems such as GSM. The UMTS wireless communication technology is an adaptation of the WCDMA 3G system by GSM. The HSDPA wireless communication technology is an Internet protocol (IP) based service, oriented for data communications, which adapts WCDMA to support data transfer rates on the order of 10 megabits per second (Mbits/s).

In some instances, a single wireless device, such a mobile phone or a personal digital assistant (PDA), for example, may enable support for a plurality of these wireless communication technologies. Enabling support to more than one wireless communication technology within a single wireless device may be expensive and/or may utilize more power, particularly in regards to the implementation and operation of the radio frequency (RF) front-end portion of the wireless device. Simplification of RF front-end designs to support multiple wireless communication technologies may not only provide a cost reduction solution but may in some instances improve the overall power consumption performance of the wireless device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a diplexer/duplexer for WCDMA operation as a filter for supporting GSM-based operation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a diplexer/duplexer for WCDMA operation as a filter for supporting GSM-based operation. Aspects of the invention may comprise a receiver portion of a wireless device that may receive HSDPA, HSUDPA, and/or WCDMA signals and GPRS, EDGE, and/or GSM signals via at least one duplexer or diplexer. The duplexers may enable bandpass filtering of received GPRS, EDGE, and/or GSM signals. The wireless device may enable receiving HSDPA, HSUDPA, and/or WCDMA signals and the GPRS, EDGE, and/or GSM signals via a single antenna coupled to the duplexers. The receiver portion may also enable selecting a processing path for received HSDPA, HSUDPA, and/or WCDMA signals or a processing path for received GPRS, EDGE, and/or GSM signals. The receiver portion may enable amplification and filtering of the HSDPA, HSUDPA, and/or WCDMA signals Filtering of the HSDPA, HSUDPA, and/or WCDMA signals may be performed via surface acoustic wave (SAW) filters. The receiver portion may also enable filtering of the GPRS, EDGE, and/or GSM signals via the duplexers and amplification of the filtered GPRS, EDGE, and/or GSM signals. This approach may enable a reduction in the area and power consumption that results in a receiver portion of a wireless device due to the number of redundant processing elements in each processing chain or path.

Aspects of the invention may relate to the integration of WCDMA with EDGE in a wireless device. In GSM and GPRS technologies, there may not be a need for a duplexer during transmission because signals are time division multiplexed, while a switch may be needed to switch between transmit and receive operations, for example. However, for receiving operations, RF bandpass filtering may be required for GSM and GPRS applications. In this regard, there may be a plurality of transmit and/or receive paths or chains implemented within a wireless transceiver in the wireless device. In some instances, filtering may not be necessary on the transmit paths utilized in GSM or GPRS applications due to time duplexing, for example. However, on the receive paths for GSM or GPRS applications, there may be a duplexer for blocking a blocker signal that results from the transmit operations. By integrating the operations of the duplexer and the bandpass filter together, component count and thus, power consumption may be minimized.

Figure 1:
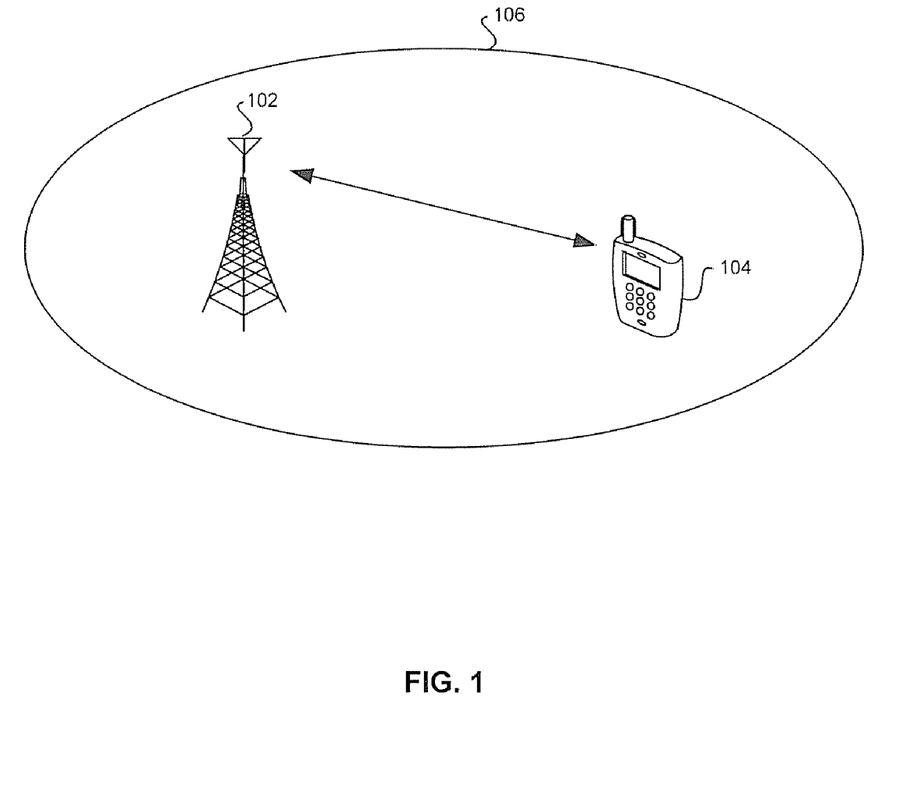
FIG. 1 is a diagram illustrating an exemplary wireless communication system, in connection with an embodiment of the invention.

FIG. 1 is a diagram illustrating an exemplary wireless communication system, in connection with an embodiment of the invention. Referring to FIG. 1, there is shown an antenna 102 and a wireless device 104. The antenna 102 may comprise suitable logic, circuitry, and/or code that may enable wireless communication of voice and/or data with the wireless device 104. The antenna 102 may communicate with the wireless device 104 over at least one of a plurality of wireless communication technologies that may comprise cellular communication technologies, for example. The antenna 102 may provide a coverage area 106 over which the wireless device 104 may communicate with the antenna 102. The antenna 102 may be communicatively coupled to at least one of a plurality of communication networks, such as cellular networks, for example, that enable communication between the wireless device 104 and other devices communicatively coupled to the corresponding communication network.

The wireless device 104 may comprise suitable logic, circuitry, and/or code that may enable wireless communication of voice and/or data with the antenna 102. The wireless device 104 may enable communication over a plurality of wireless communication technologies that may comprise cellular technologies. For example, the wireless device 104 may support WCDMA/EDGE (WEDGE) technologies. In another example, the wireless device 104 may support HSDPA/WCDMA/EDGE (HEDGE) technologies. Notwithstanding, aspects of the invention need not be limited to these exemplary combinations of wireless communication technologies supported by the wireless device 104. For example, the wireless device 104 may support HSDPA, HSUDPA, WCDMA, GPRS, EDGE, and/or GSM wireless communication technologies or wireless protocols.

Figure 2:
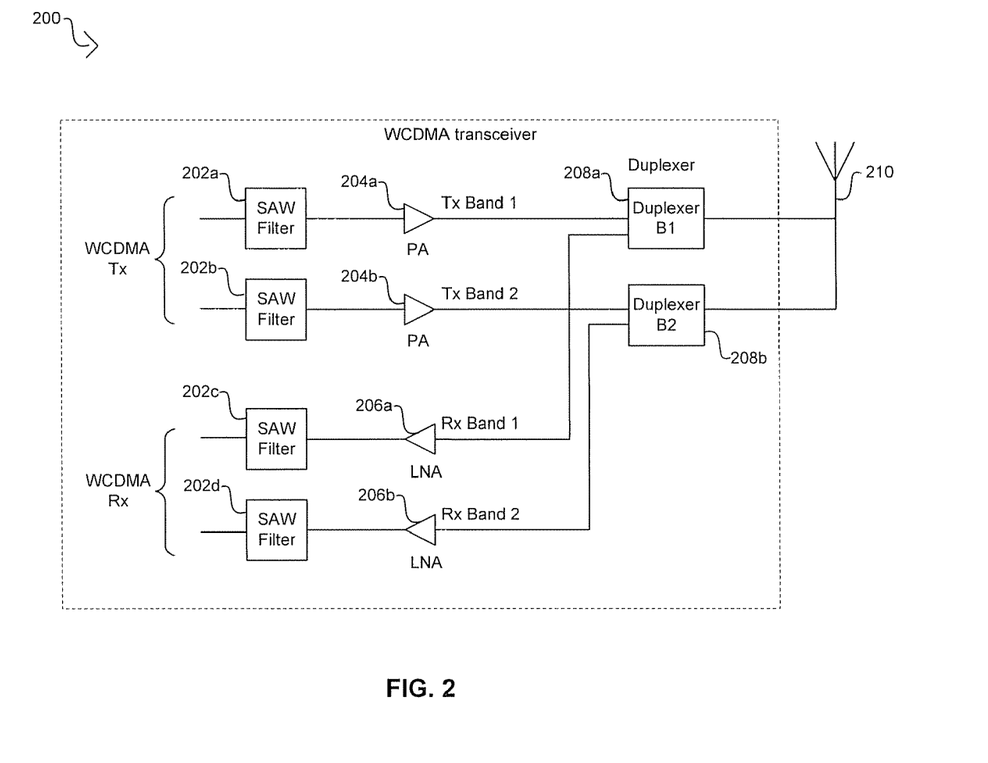
FIG. 2 is a block diagram illustrating an exemplary WCDMA transceiver comprising duplexers for each communication band, in accordance with an embodiment of the invention.

FIG. 2 is a block diagram illustrating an exemplary WCDMA transceiver comprising duplexers for each communication band, in accordance with an embodiment of the invention. Referring to FIG. 2, there is shown a WCDMA transceiver 200 that may be comprised within the wireless device 104 in FIG. 1, for example. The WCDMA transceiver 200 may comprise suitable logic, circuitry, and/or code that may enable communication between the wireless device 104 and the antenna 102, for example. In this regard, the WCDMA transceiver 200 may be communicatively coupled to an antenna 210 that enables wireless communication with the antenna 102.

As shown, the WCDMA transceiver 200 may utilize two (2) communication bands, band 1 and band 2, although aspects of the invention need not be so limited. The transmit paths of the WCDMA transceiver 200 may comprise path surface acoustic wave (SAW) filters 202a and 202b and power amplifiers (PAs) 204a and 204b. The receive paths of the WCDMA transceiver 200 may comprise SAW filters 202c and 202d and low-noise amplifiers (LNAs) 206a and 206b. The WCDMA transceiver 200 may also comprise duplexers 208a (B1) associated with band 1 and 208b (B2) associated with band 2.

The duplexers 208a and 208b may comprise suitable logic, circuitry, and/or code that may enable combination of two or more signals onto a common channel or medium to increase its transmission efficiency. The duplexers 208a and 208b enable isolation between the receive paths or receiver portion of the WCDMA transceiver 200 and the transmit paths or transmitter portion of the WCDMA transceiver 200 while allowing for both paths or portions to share a common antenna. The duplexers 208a and 208b may enable operation in the appropriate frequency band utilized by the receiver portion and the transmitter portion and may be capable of handling the output power produced by the PAs 204a and 204b. Moreover, the duplexers 208a and 208b may enable adequate rejection of transmitter noise at the receive frequencies and may need to provide sufficient isolation to prevent receiver desensitization. In the exemplary embodiment of the invention disclosed in FIG. 2, the duplexer 208a may be associated with handling transmit and receive signals in band 1 while the duplexer 208b may be associated with handling transmit and receive signals in band 2. The operations provided by the duplexers 208a and 208b may also be provided by other devices, such as diplexers or combiners, for example.

The SAW filters 202a and 202b may comprise suitable logic, circuitry, and/or code that may enable filtering signals before amplification via the PAs 204a and 204b, respectively, and transmission via the antenna 210. The SAW filters 202c and 202d may comprise suitable logic, circuitry, and/or code that may enable filtering signals received via the antenna 210 after amplification via the LNAs 206a and 206b, respectively. The PAs 204a and 204b may comprise suitable logic, circuitry, and/or code that may enable sufficient amplification of signals for transmission via the antenna 210. The LNAs 206a and 206b may comprise suitable logic, circuitry, and/or code that may enable sufficient amplification of received signals prior to filtering by the SAW filters 202c and 202d.

In operation, band 1 transmit signals (Tx Band 1) and band 2 transmit signals (Tx Band 2) may be received from another portion of the WCDMA transceiver 200 or from another portion of the wireless receiver 104 and may be filtered by utilizing the SAW filters 202a and 202b respectively. Moreover, the filtered signals may be amplified by utilizing the PAs 204a and 204b respectively. The amplified transmit signals may be communicated to the duplexers 208a and 208b for transmission via the antenna 210.

Band 1 receive signals (Rx Band 1) and band 2 receive signals (Rx Band 2) may be received via the antenna 210 and may be communicated to the duplexers 208a and 208b respectively. The duplexers 208a and 208b may communicate the receive signals Rx Band 1 and Rx Band 2 to the LNAs 206a and 206b for amplification. After amplification, the receive signals may be communicated to the SAW filters 202c and 202d for filtering and the filtered signals may later be communicated to another portion of the WCDMA transceiver 200 or to another portion of the wireless receiver 104 for further processing.

Notwithstanding, the WCDMA transceiver 200 disclosed in FIG. 2 may also support transmission and/or reception of other wireless protocols such as HSDPA and/or HSUDPA, for example, in the same manner or substantially the same manner as for WCDMA wireless protocol signals.

Figure 3:
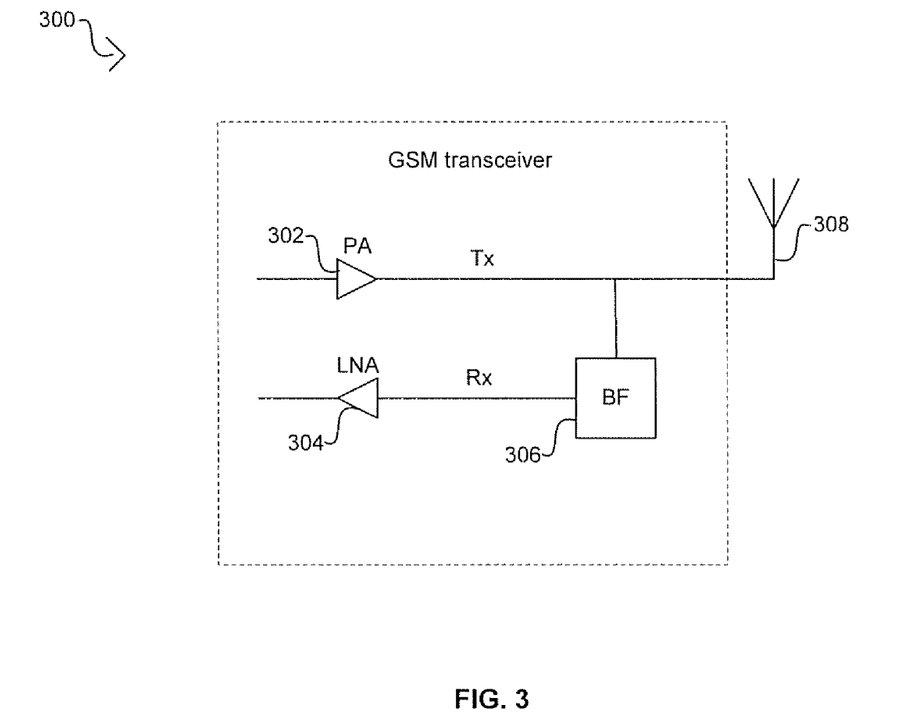
FIG. 3 is a block diagram illustrating an exemplary GSM transceiver comprising a bandpass filter in the receiving path, in accordance with an embodiment of the invention.

FIG. 3 is a block diagram illustrating an exemplary GSM transceiver comprising a bandpass filter in the receiving path, in accordance with an embodiment of the invention. Referring to FIG. 3, there is shown a GSM transceiver 300 that may be comprised within the wireless device 104 in FIG. 1, for example. The GSM transceiver 300 may comprise suitable logic, circuitry, and/or code that may enable communication between the wireless device 104 and the antenna 102, for example. In this regard, the GSM transceiver 300 may be communicatively coupled to an antenna 308 that enables wireless communication with the antenna 102.

As shown, the GSM transceiver 300 may utilize one communication band, although aspects of the invention need not be so limited. The transmit path of the GSM transceiver 300 may comprise a power amplifier (PA) 302. The receive path of the GSM transceiver 300 may comprise a bandpass filter 306 and a low-noise amplifier (LNA) 304. The bandpass filter 306 may comprise suitable logic, circuitry, and/or code that may enable filtering signals received via the antenna 308. The PA 302 may comprise suitable logic, circuitry, and/or code that may enable sufficient amplification of transmit signals (Tx) via the antenna 308. The LNA 304 may comprise suitable logic, circuitry, and/or code that may enable sufficient amplification of received filtered signals from the bandpass filter 306.

In operation, transmit signals (Tx) may be received from another portion of the GSM transceiver 300 or from another portion of the wireless receiver 104 and may be amplified by utilizing the PA 302. The amplified transmit signals may be communicated to the antenna 308 for transmission. The receive signals (Rx) may be received by the antenna 308 and may be communicated to the bandpass filter 306 for filtering. The bandpass filter 306 may communicate the filtered received signals to the LNA 304 for amplification. The amplified signals may be communicated to another portion of the GSM transceiver 300 or to another portion of the wireless receiver 104 for further processing.

Notwithstanding, the GSM transceiver 300 disclosed in FIG. 3 may also support transmission and/or reception of other wireless protocols such as GPRS and/or EDGE, for example, in the same manner or substantially the same manner as for GSM wireless protocol signals.

Figure 4:
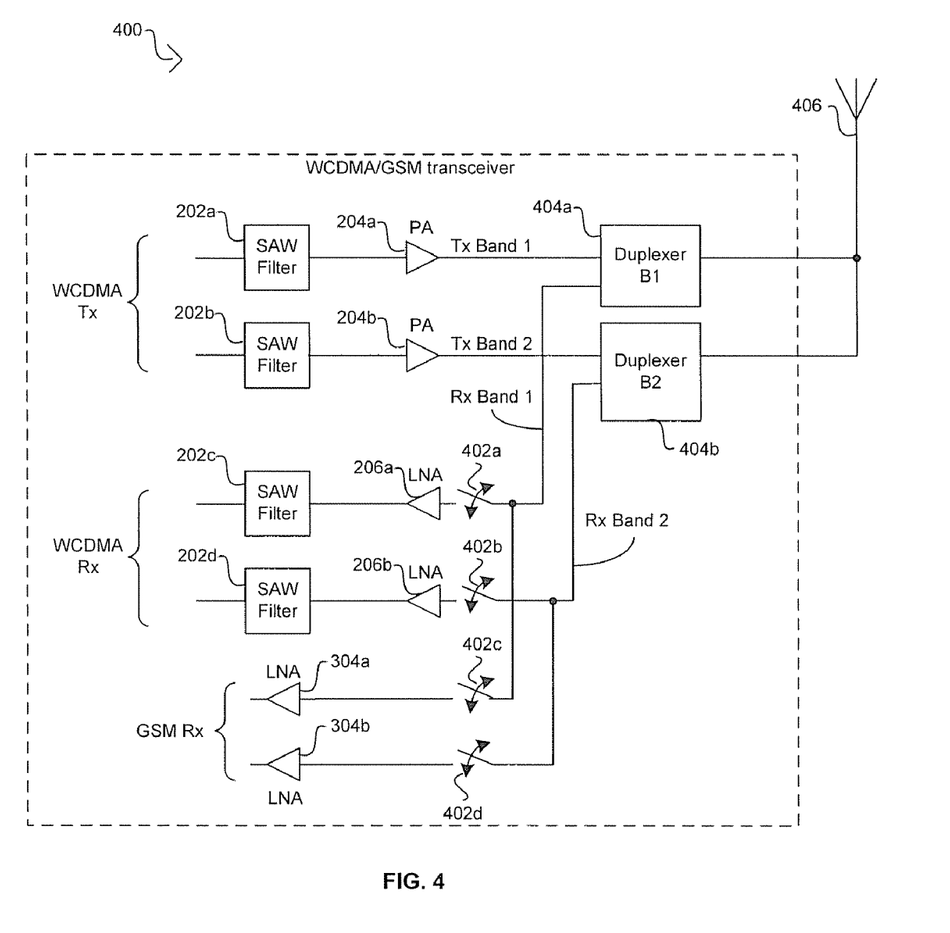
FIG. 4 is a block diagram illustrating an exemplary WCDMA/GSM transceiver, in accordance with an embodiment of the invention.

FIG. 4 is a block diagram illustrating an exemplary WCDMA/GSM transceiver, in accordance with an embodiment of the invention Referring to FIG. 4, there is shown a WCDMA/GSM transceiver 400 that may be comprised within the wireless device 104 in FIG. 1, for example. The WCDMA/GSM transceiver 400 may comprise suitable logic, circuitry, and/or code that may enable communication between the wireless device 104 and the antenna 102, for example. In this regard, the WCDMA/GSM transceiver 400 may be communicatively coupled to an antenna 406 that enables wireless communication with the antenna 102.

As shown, the WCDMA/GSM transceiver 400 may utilize two (2) communication bands, band 1 and band 2, although aspects of the invention need not be so limited. The transmit paths for the WCDMA portion of the WCDMA/GSM transceiver 400 may comprise path SAW filters 202a and 202b, and PAs 204a and 204b as disclosed in FIG. 2. The receive paths for the WCDMA portion of the WCDMA/GSM transceiver 400 may comprise SAW filters 202c and 202d, LNAs 206a and 206b, as disclosed in FIG. 2, and switches 402a and 402b. The receive paths for the GSM portion of the WCDMA/GSM transceiver 400 may comprise LNAs 304a and 304b, and switches 402c and 402d. The LNAs 304a and 304b may be the same or substantially similar to the LNA 304 disclosed in FIG. 4. The switches 402a and 402b may comprise suitable logic, circuitry, and/or code that may enable selecting a processing path that comprises the receive paths for the WCDMA portion of the WCDMA/GSM transceiver 400 when the received signals are WCDMA signals. The switches 402c and 402d may enable selecting a processing path that comprises the receive paths for the GSM portion of the WCDMA/GSM transceiver 400 when the received signals are GSM signals.

The WCDMA/GSM transceiver 400 may also comprise duplexers 404a (B1) associated with band 1 and 404b (B2) associated with band 2. The duplexers 404a and 404b may comprise suitable logic, circuitry, and/or code that enable combination of two or more signals onto a common channel or medium to increase its transmission efficiency. The duplexers 404a and 404b may be substantially similar to the duplexers 208a and 208b disclosed in FIG. 2. However, the duplexers 404a and 404b may also enable providing bandpass filtering for received GSM signals. In this regard, when GSM signals are received, the operations provided by the duplexers 404a and 404b may also comprise bandpass filtering of the received GSM signals. Enabling bandpass filtering of received GSM signals in the duplexers 404a and 404b may enable the WCDMA/GSM transceiver 400 to provide substantially similar operations as the WCDMA transceiver 200 and the GSM transceiver 300 with a reduced number of system elements or components. The operations provided by the duplexers 404a and 404b may also be provided by other devices, such as diplexers or combiners, for example.

Notwithstanding, the WCDMA/GSM transceiver 400 disclosed in FIG. 4 may also support transmission and/or reception of other wireless protocols such as GPRS and/or EDGE, for example, in the same manner or substantially the same manner as for GSM wireless protocol signals. Moreover, the WCDMA/GSM transceiver 400 may also support transmission and/or reception of other wireless protocols such as HSDPA and/or HSUDPA, for example, in the same manner or substantially the same manner as for WCDMA wireless protocol signals.

Figure 5:
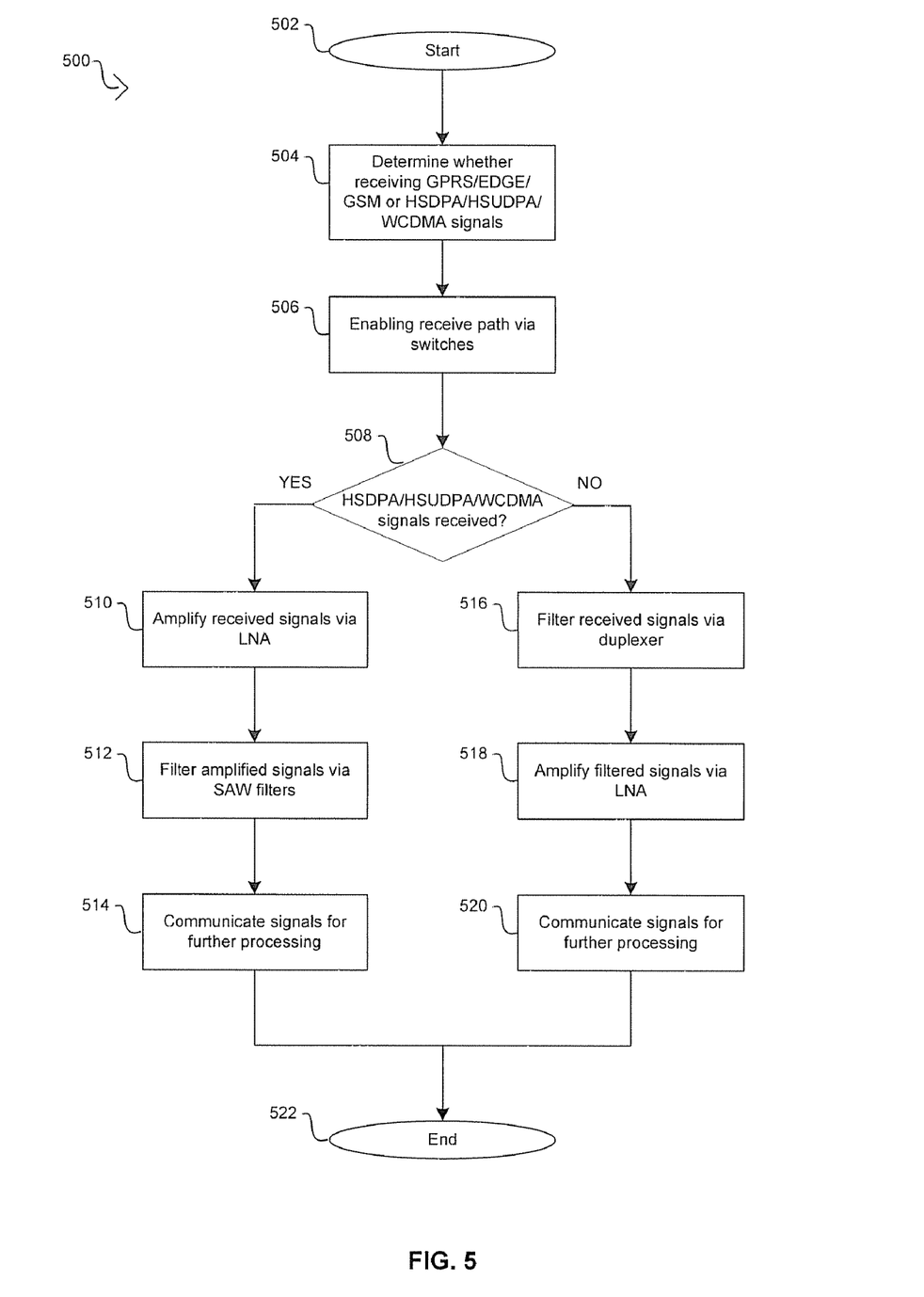
FIG. 5 is a flow diagram illustrating exemplary steps in the operation of the WCDMA/GSM transceiver in FIG. 4, in accordance with an embodiment of the invention.

FIG. 5 is a flow diagram illustrating exemplary steps in the operation of the WCDMA/GSM transceiver in FIG. 4, in accordance with an embodiment of the invention. Referring to FIG. 5, there is shown a flow diagram 500. In step 504, after start step 502, the wireless receiver 104 may determine whether it is receiving HSDPA, HSUDPA, and/or WCDMA signals or GPRS, EDGE, and/or GSM signals. In step 506, when GPRS/EDGE/GSM signals are being received in step 504, the WCDMA/GSM transceiver 400 may generate at least one signal or may receive at least one signal to open the switches 402*a* and 402*b* and to close the switches 402*c* and 402*d* to enable the received GPRS, EDGE, and/or GSM signals to be communicated from the duplexers 404*a* and 404*b* to the LNAs 304*a* and 304*b*. Moreover, the WCDMA/GSM transceiver 400 may generate at least one signal or may receive at least one signal to indicate to the duplexers 404*a* and 404*b* to enable bandpass filtering for the received GPRS, EDGE, and/or GSM signals. Returning to step 506, when HSDPA, HSUDPA, and/or WCDMA signals are being received in step 504, the WCDMA/GSM transceiver 400 may generate at least one signal or may receive at least one signal to close the switches 402*a* and 402*b* and to open the switches 402*c* and 402*d* to enable the received HSDPA, HSUDPA, and/or WCDMA signals to be communicated from the duplexers 404*a* and 404*b* to the LNAs 206*a* and 206*b*.

In step 508, when HSDPA, HSUDPA, and/or WCDMA signals are received and the appropriate switch configuration has been enabled, the process may proceed to step 510. In step 510, the received HSDPA, HSUDPA, and/or WCDMA signals may be communicated from the duplexers 404*a* and 404*b* to the LNAs 206*a* and 206*b* for amplification via the closed switches 402*a* and 402*b*. In step 512, the amplified HSDPA, HSUDPA, and/or WCDMA signals may be communicated to the SAW filters 202*c* and 202*d* for filtering. After filtering, in step 514, the filtered HSDPA, HSUDPA, and/or WCDMA signals may be communicated to another portion of the WCDMA/GSM transceiver 400 or to another portion of the wireless device 104 for further processing. After step 514, the process may proceed to end step 524.

Returning to step 508, when GPRS, EDGE, and/or GSM signals are received, the appropriate switch configuration has been enabled, and the bandpass filtering has been enabled in the duplexers 404*a* and 404*b*, the process may proceed to step 516. In step 516, the received GPRS, EDGE, and/or GSM signals may be filtered by the duplexers 404*a* and 404*b*. In step 518, the filtered GPRS, EDGE, and/or GSM signals may be communicated to the LNAs 304*a* and 304*b* for amplification via the closed switches 402*c* and 402*d*. After amplification, in step 520, the amplified GPRS, EDGE, and/or GSM signals may be communicated to another portion of the WCDMA/GSM transceiver 400 or to another portion of the wireless device 104 for further processing. After step 520, the process may proceed to end step 524.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling wireless signals, the method comprising:
   receiving first wireless protocol signals and second wireless protocol signals via one or more duplexers coupled to a receiver in a wireless device; and
   selecting, via a plurality of switching elements, within said receiver one of a processing path for said received first wireless protocol signals and a processing path for said received second wireless protocol signals, wherein:
      said plurality of switching elements directly couple each of said one or more duplexers to an input of a low noise amplifier of said processing path for said received first wireless protocol signals, and to an input of another low noise amplifier of said processing path for said received second wireless protocol signals; and
      each of said one or more duplexers band pass filters said received second protocol signals.

2. The method according to claim 1, wherein said first wireless protocol signals is one of: HSDPA, HSUDPA, and WCDMA wireless protocol signals.

3. The method according to claim 1, wherein said second wireless protocol signals is one of: GPRS, EDGE, and GSM wireless protocol signals.

4. The method according to claim 1, comprising amplifying said received first wireless protocol signals.

5. The method according to claim 4, comprising filtering said amplified received first wireless protocol signals.

6. The method according to claim 5, wherein said filtering is performed via a surface acoustic wave (SAW) filter.

7. The method according to claim 1, comprising amplifying said filtered received second wireless protocol signals.

8. The method of claim 1, comprising receiving said first wireless protocol signals and said second wireless protocol signals via a single antenna coupled to said at least one duplexor.

9. A non-transitory computer-readable medium having stored thereon, a computer program having at least one code section for handling wireless signals, the at least one code section being executable by a machine for causing the machine to perform steps comprising:
  receiving first wireless protocol signals and second wireless protocol signals via one or more duplexers coupled to a receiver in a wireless device; and
  selecting, via a plurality of switching elements, within said receiver one of a processing path for said received first wireless signals and a processing path for said received second wireless protocol signals, wherein:
    said plurality of switching elements directly couple each of said one or more duplexers to an input of a low noise amplifier of said processing path for said received first wireless protocol signals, and to an input of another low noise amplifier of said processing path for said received second wireless protocol signals; and
    each of said one or more duplexers band pass filters said received second protocol signals.

10. The non-transitory computer-readable medium according to claim 9, wherein said first wireless protocol signals is one of HSDPA, HSUDPA, and WCDMA wireless protocol signals.

11. The non-transitory computer-readable medium according to claim 9, wherein said second wireless protocol signals is one of: GPRS, EDGE, and GSM wireless protocol signals.

12. The non-transitory computer-readable medium according to claim 9, wherein said at least one code section comprises for controlling amplification of said received first wireless protocol signals.

13. The non-transitory computer-readable medium according to claim 12, wherein said at least one code section comprises for controlling filtering of said amplified received first wireless protocol signals.

14. The non-transitory computer-readable medium according to claim 13, wherein said filtering is performed via a surface acoustic wave (SAW) filter.

15. The non-transitory computer-readable medium according to claim 9, wherein said at least one code section comprises for controlling filtering of said received second wireless protocol signals via said at least one duplexer.

16. The non-transitory computer-readable medium according to claim 15, wherein said at least one code section comprises for controlling amplification of said filtered received second wireless protocol signals.

17. A system for handling wireless signals, the system comprising:
  a receiver in a wireless device that is operable to receive first wireless protocol signals and second wireless protocol signals via one or more duplexers coupled to a receiver in a wireless device; and
  said receiver comprises a plurality of switching elements operable to select one of a processing path for said received first wireless protocol signals and a processing path for said received second wireless protocol signals, wherein:
    said plurality of switching elements directly couple each of said one or more duplexers to an input of a low noise amplifier of said processing path for said received first wireless protocol signals, and to an input of another low noise amplifier of said processing path for said received second wireless protocol signals;
    each of said one or more duplexers band pass filters said received second protocol signals.

18. The system according to claim 17, wherein said first wireless protocol signals is one of: HSDPA, HSUDPA, and WCDMA wireless protocol signals.

19. The system according to claim 17, wherein said second wireless protocol signals is one of: GPRS, EDGE, and GSM wireless protocol signals.

20. The system according to claim 19, wherein said receiver is operable to amplify said received first wireless protocol signals.

21. The system according to claim 20, wherein said receiver is operable to filter said amplified received first wireless protocol signals.

22. The system according to claim 20, wherein said receiver performs said filtering via a surface acoustic wave (SAW) filter.

23. The system according to claim 20, wherein said receiver is operable to amplify said filtered received second wireless protocol signals.

24. The system according to claim 20, wherein said wireless device is operable to receive said first wireless protocol signals and said second wireless protocol signals via a single antenna coupled to said at least one duplexer.

* * * * *